(12) United States Patent
Sun et al.

(10) Patent No.: US 12,675,738 B2
(45) Date of Patent: Jul. 7, 2026

(54) SYSTEMS AND METHODS FOR PROVIDING FAIRNESS MEASURES FOR REGRESSION MACHINE LEARNING MODELS BASED ON ESTIMATING CONDITIONAL DENSITIES USING GAUSSIAN MIXTURES

(71) Applicant: Verizon Patent and Licensing Inc., Basking Ridge, NJ (US)

(72) Inventors: Wei Sun, Fairfax, VA (US); Joshua Scott Andrews, Raleigh, NC (US); Xuning Tang, Mclean, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 563 days.

(21) Appl. No.: 18/349,403

(22) Filed: Jul. 10, 2023

(65) Prior Publication Data

US 2025/0021867 A1     Jan. 16, 2025

(51) Int. Cl.
G06N 20/00 (2019.01)

(52) U.S. Cl.
CPC .................................... G06N 20/00 (2019.01)

(58) Field of Classification Search
CPC ........... G06N 20/00; G06N 7/01; G06N 20/10
See application file for complete search history.

(56) References Cited

U.S. PATENT DOCUMENTS

| | | | | | |
|---|---|---|---|---|---|
| 11,410,050 B2 * | 8/2022 | Baker | ..................... | G06N 3/088 |
| 11,531,900 B2 * | 12/2022 | Baker | ..................... | G06N 3/088 |
| 11,687,788 B2 * | 6/2023 | Baker | ..................... | G06N 3/088 706/13 |
| 12,248,882 B2 * | 3/2025 | Baker | ..................... | G06N 3/088 |
| 12,423,586 B2 * | 9/2025 | Baker | ..................... | G06N 3/088 |
| 2011/0055121 A1 * | 3/2011 | Datta | ..................... | G06N 7/01 706/12 |
| 2020/0225655 A1 * | 7/2020 | Cella | ................... | G05B 19/4184 |
| 2020/0285939 A1 * | 9/2020 | Baker | ..................... | G06N 3/088 |

(Continued)

OTHER PUBLICATIONS

Kamiran et al., "Classification with No. Discrimination by Preferential Sampling," Informal Proceedings of the 19th Annual Machine Learning Conference of Belgium and The Netherlands, 2010, 6 Pages.

(Continued)

*Primary Examiner* — Bhavesh V Amin

(57) ABSTRACT

A device may receive sensitive attribute data, model prediction data, and true target data associated with a regression machine learning model, and may determine quantities of Gaussian components for Gaussian mixtures. The device may generate Gaussian mixtures of the quantities of Gaussian components based on the sensitive attribute data, the model prediction data, and the true target data, and may determine parameters of estimates of conditional densities by the Gaussian mixtures based on the sensitive attribute data, the model prediction data, and the true target data. The device may calculate an independence measure, a separation measure, and a sufficiency measure of the regression machine learning model based on the Gaussian mixtures and the parameters of the estimates of the conditional densities. The device may perform actions based on one or more of the independence measure, the separation measure, or the sufficiency measure.

20 Claims, 11 Drawing Sheets

100 ➞

(56) References Cited

U.S. PATENT DOCUMENTS

| | | | | |
|---|---|---|---|---|
| 2020/0302524 | A1* | 9/2020 | Kamkar | G06N 3/09 |
| 2020/0320371 | A1* | 10/2020 | Baker | G06N 3/088 |
| 2020/0348662 | A1* | 11/2020 | Cella | G05B 23/0294 |
| 2021/0157312 | A1* | 5/2021 | Cella | G06Q 30/06 |
| 2022/0108262 | A1* | 4/2022 | Cella | G05B 17/02 |
| 2022/0164877 | A1* | 5/2022 | Kamkar | G06F 18/24323 |
| 2022/0335305 | A1* | 10/2022 | Baker | G06N 3/088 |
| 2022/0383131 | A1* | 12/2022 | Baker | G06N 3/088 |
| 2023/0105547 | A1* | 4/2023 | Kamkar | G06Q 40/03 705/38 |
| 2023/0289611 | A1* | 9/2023 | Baker | G06N 3/088 |
| 2025/0209333 | A1* | 6/2025 | Baker | G06N 3/088 |
| 2025/0217508 | A1* | 7/2025 | Cherubin | G06N 3/0985 |
| 2025/0384341 | A1* | 12/2025 | Cella | G06N 20/00 |
| 2025/0390753 | A1* | 12/2025 | Baker | G06N 3/088 |

OTHER PUBLICATIONS

Zhao et al., "Maximum Relevance and Minimum Redundancy Feature Selection Methods for a Marketing Machine Learning Platform," IEEE International Conference on Data Science and Advanced Analytics (DSAA), Aug. 15, 2019, 11 Pages.

Steinberg et al., "Fairness Measures for Regression via Probabilistic Classification," 2nd Ethics of Data Science Conference (EDSC 2020), Sydney, Australia, 9 Pages.

Agarwal et al., "Fair Regression: Quantitative Definitions and Reduction-based Algorithms," International Conference on Machine Learning, May 30, 2019, 18 Pages.

Barocas et al., "Fairness in Machine Learning: Limitations and Opportunities," Website: http://www.fairmlbook.org, 2019, 181 Pages.

Berk et al., "A Convex Framework for Fair Regression," Proceedings of the Conference on Fairness, Accountability, and Transparency—FAT (2017), 5 Pages.

Bickel et al., "Discriminative Learning Under Covariate Shift," Journal of Machine Learning Research, vol. 10, 2009, 19 Pages.

Christopher M. Bishop, "Pattern Recognition and Machine Learning," Springer Publishing, 2006, 758 Pages.

Caton et al., "Fairness in Machine Learning: A Survey," Website: https://arxiv.org/abs/2010.04053, Oct. 4, 2020, 33 Pages.

Chang et al., "Scalable Fusion with Mixture Distributions in Sensor Networks," 11th Int. Conf. Control, Automation, Robotics and Vision, Dec. 7-10, 2010, 6 Pages.

Cover et al., "Elements of Information Theory," Wiley-Interscience Publisher, 1991, 563 Pages.

Dua et al., "UCI Machine Learning Repository: Communities and Crime," Website: http://archive.ics.uci.edu/ml, 2009, 17 Pages.

Fitzsimons et al., "A General Framework for Fair Regression," Entropy vol. 21, No. 8, 2019, 22 Pages.

Jing Qin, "Inferences for Case-Control and Semiparametric Two-Sample Density Ratio Models," Biometrika, vol. 85, No. 3, Sep. 1998, 13 Pages.

Rasmussen et al., "Gaussian Processes for Machine Learning," MIT Press, 2006, 266 Pages.

Sugiyama et al., "Density Ratio Estimation in Machine Learning," RIMS Kokyuroku, 2010, 12 Pages.

Sun et al., "Scalable Inference for Hybrid Bayesian Networks with Full Density Estimations," Proceedings of the 13th International Conference on Information Fusion, 2010, 8 Pages.

Hsi Guang Sung, "Gaussian Mixture Regression and Classification," Rice University PhD Thesis, May 2004, 117 Pages.

* cited by examiner

100

115
Receive sensitive attribute data, model prediction data, and true target data associated with a regression machine learning model 120
Determine quantities of Gaussian components for Gaussian mixtures associated with the regression machine learning model Bias detection system
110

User device
105

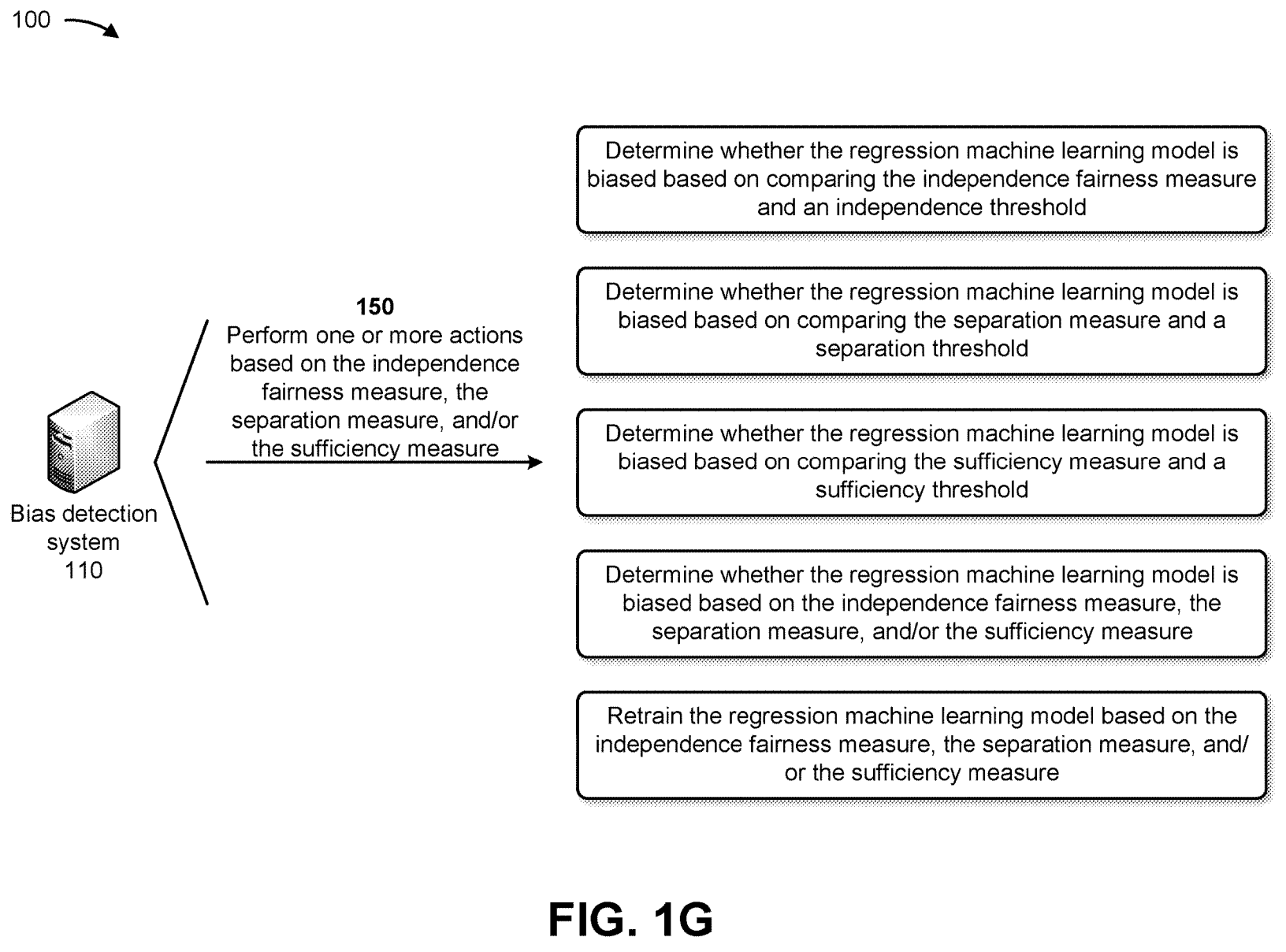

100

Determine whether the regression machine learning model is biased based on comparing the independence fairness measure and an independence threshold Determine whether the regression machine learning model is biased based on comparing the separation measure and a separation threshold Determine whether the regression machine learning model is biased based on comparing the sufficiency measure and a sufficiency threshold Determine whether the regression machine learning model is biased based on the independence fairness measure, the separation measure, and/or the sufficiency measure Retrain the regression machine learning model based on the independence fairness measure, the separation measure, and/or the sufficiency measure

150
Perform one or more actions based on the independence fairness measure, the separation measure, and/or the sufficiency measure Bias detection system
110

FIG. 1G

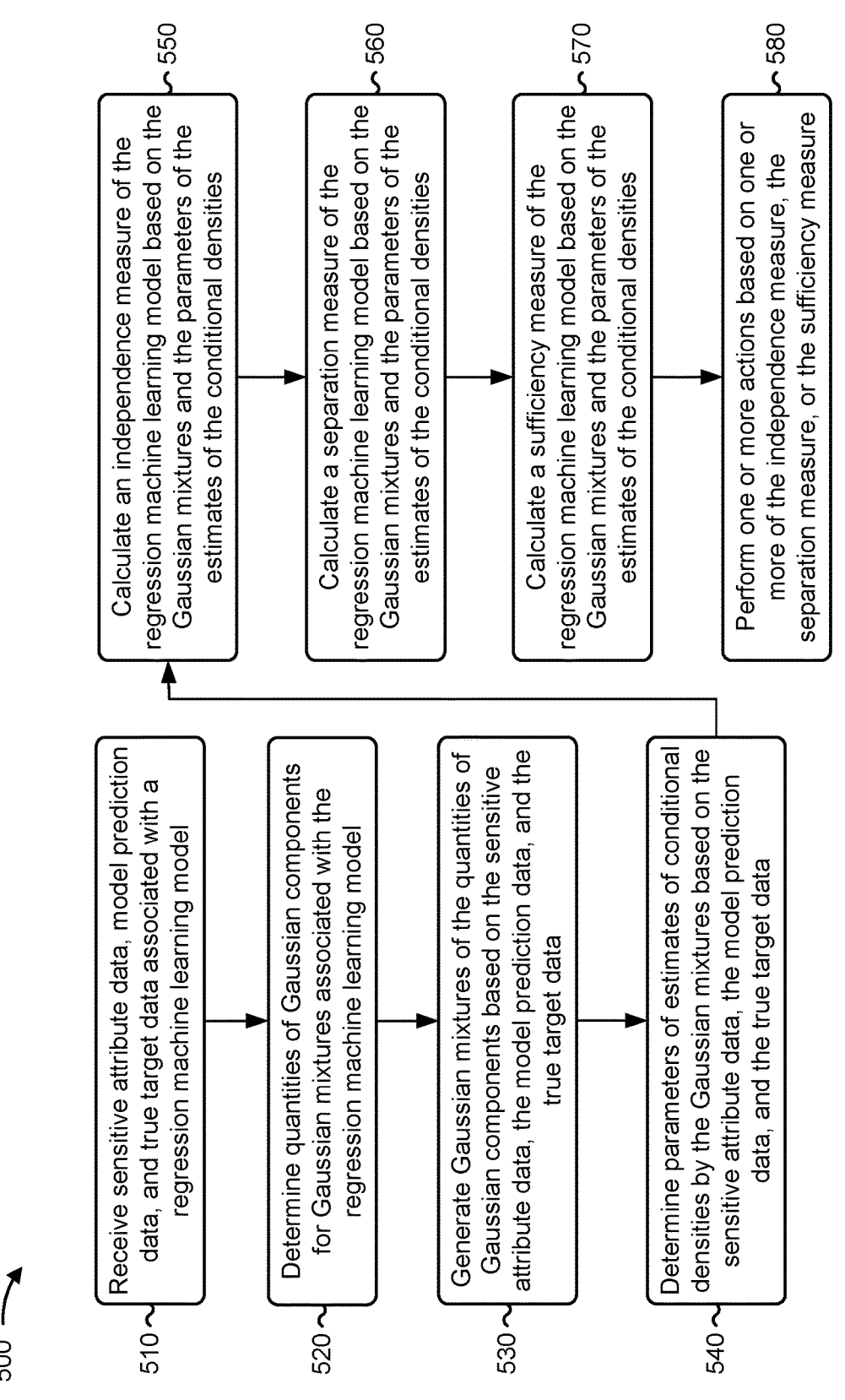

500

510 — Receive sensitive attribute data, model prediction data, and true target data associated with a regression machine learning model 520 — Determine quantities of Gaussian components for Gaussian mixtures associated with the regression machine learning model 530 — Generate Gaussian mixtures of the quantities of Gaussian components based on the sensitive attribute data, the model prediction data, and the true target data 540 — Determine parameters of estimates of conditional densities by the Gaussian mixtures based on the sensitive attribute data, the model prediction data, and the true target data 550 — Calculate an independence measure of the regression machine learning model based on the Gaussian mixtures and the parameters of the estimates of the conditional densities 560 — Calculate a separation measure of the regression machine learning model based on the Gaussian mixtures and the parameters of the estimates of the conditional densities 570 — Calculate a sufficiency measure of the regression machine learning model based on the Gaussian mixtures and the parameters of the estimates of the conditional densities 580 — Perform one or more actions based on one or more of the independence measure, the separation measure, or the sufficiency measure

FIG. 5

SYSTEMS AND METHODS FOR PROVIDING FAIRNESS MEASURES FOR REGRESSION MACHINE LEARNING MODELS BASED ON ESTIMATING CONDITIONAL DENSITIES USING GAUSSIAN MIXTURES

BACKGROUND

A regression machine learning model may determine a relationship between one or more independent variables and a response, dependent, or target variable.

BRIEF DESCRIPTION OF THE DRAWINGS

FIGS. 1A-1G are diagrams of an example associated with providing fairness measures for regression machine learning models based on estimating conditional densities using Gaussian mixtures.

FIG. 5 is a flowchart of an example process for providing fairness measures for regression machine learning models based on estimating conditional densities using Gaussian mixtures.

DETAILED DESCRIPTION OF EXAMPLE EMBODIMENTS

Figure 1A:
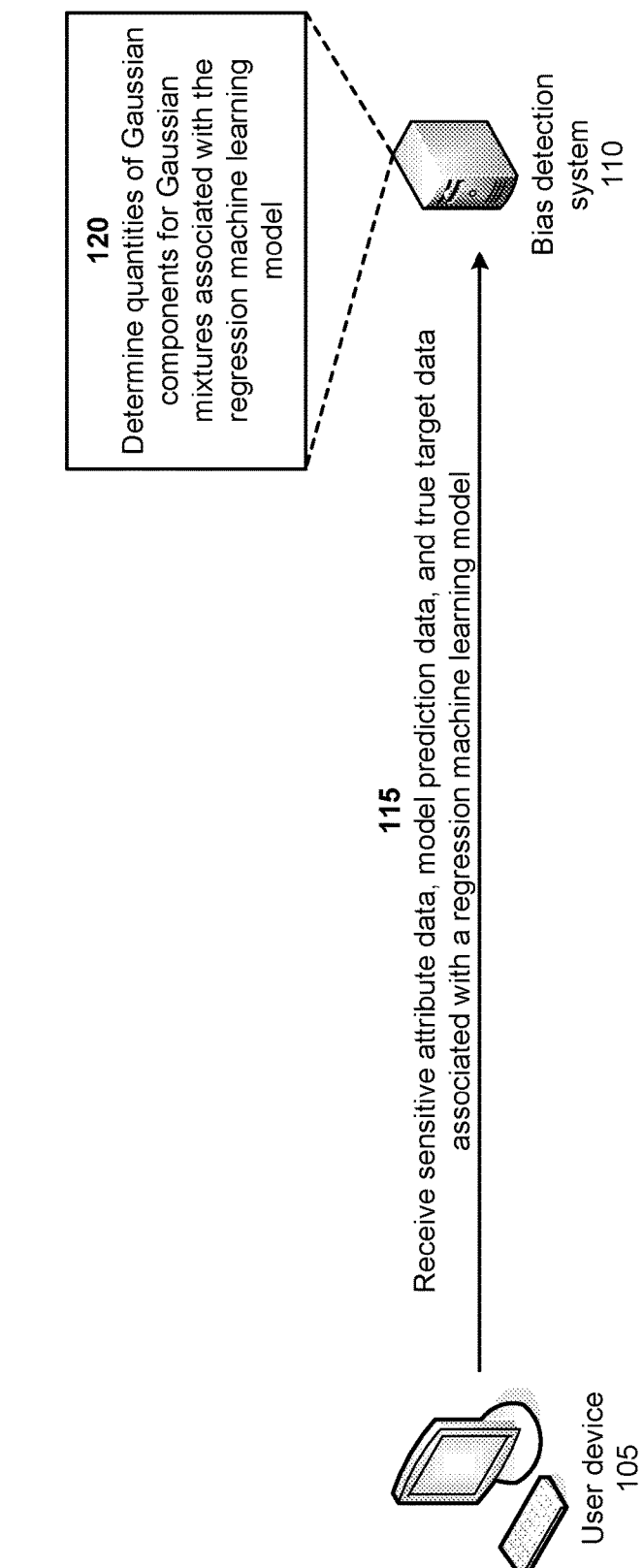

The following detailed description of example implementations refers to the accompanying drawings. The same reference numbers in different drawings may identify the same or similar elements.

Since machine learning models have been widely used to drive better business outcomes in almost all industries, a need to better govern machine learning models has become unprecedented because bias can affect machine learning models to cause irreversible damage. Regression machine learning models may generate biased results due to being trained with biased training data. A biased regression machine learning model may be determined based on group fairness. For example, Y and $\hat{Y}$ may represent continuous random variables representing a target variable and a model prediction, respectively, and A may represent a discrete random variable (e.g., gender, ethnic group, and/or the like) for sensitive groups (e.g., a categorical sensitive attribute) for which model fairness is evaluated. Y, $\hat{Y}$, and A may be one-dimension random variables, may be extended to high dimensional variables. Instances of Y, $\hat{Y}$, and A may be denoted as y, $\hat{y}$, and a, which are scalar values. Further, $y \subseteq R$, $\hat{y} \subseteq R$, and $a \in \{1, \ldots, C\}$, where C represents a cardinality of the categorical variable A. The data may include observations of these three variables. Each data point indexed by i may include a corresponding $y_i$, $\hat{y}_i$, and $a^i$. Group fairness may be determined based on independence, separation, and sufficiency, which are statistically independent or conditionally independent statements defined as:

$$\text{Independence: } \hat{Y} \perp A \rightarrow P(\hat{Y}, A) = P(\hat{Y})P(A), \quad (1)$$

-continued
$$\text{Separation: } \hat{Y} \perp A \mid Y \rightarrow P(\hat{Y}, A \mid Y) = P(\hat{Y} \mid Y)P(A \mid Y), \quad (2)$$

and $$\text{Sufficiency: } Y \perp A \mid \hat{Y} \rightarrow P(Y, A \mid \hat{Y}) = P(Y \mid \hat{Y})P(A \mid \hat{Y}). \quad (3)$$

where the independence fairness measure determines whether the model prediction data ($\hat{Y}$) is independent of the sensitive attribute data (A), the separation measure determines whether the model prediction data ($\hat{Y}$) is conditionally independent of the sensitive attribute data (A) based on the true target data (Y), and the sufficiency measure determines whether the true target data (Y) is conditionally independent of the sensitive attribute data (A) based on the model prediction data ($\hat{Y}$).

Determination of group fairness requires determining degrees of satisfying independence, separation, and sufficiency (e.g., to determine metrics to evaluate independence or conditional independence between the variables). However, for regression machine learning models, both the target variable and the model prediction are continuously distributed. Therefore, group fairness (especially for separation and sufficiency) cannot be easily calculated with regression machine learning models. Various proposed fairness measures for regression machine learning models are not as intuitive as independence, separation, and sufficiency, or are simplifications that fail to fully capture important properties of independence, separation, and sufficiency.

Thus, current systems for determining bias in regression machine learning models consume computing resources (e.g., processing resources, memory resources, communication resources, and/or the like), networking resources, and/or other resources associated with failing to generate unbiased regression machine learning models, erroneously utilizing biased results generated by biased regression machine learning models, attempting to correct biased regression machine learning models, failing to identify biased regression machine learning models, and/or the like.

Some implementations described herein provide a bias detection system that provides fairness measures for regression machine learning models based on estimating conditional densities using Gaussian mixtures. For example, the bias detection system may receive sensitive attribute data, model prediction data, and true target data associated with a regression machine learning model, and may determine quantities of Gaussian components for Gaussian mixtures associated with the regression machine learning model. The bias detection system may generate Gaussian mixtures of the quantities of Gaussian components based on the sensitive attribute data, the model prediction data, and the true target data, and may determine parameters of estimates of conditional densities by the Gaussian mixtures based on the sensitive attribute data, the model prediction data, and the true target data. The bias detection system may calculate an independence measure of the regression machine learning model based on the Gaussian mixtures and the parameters of the estimates of the conditional densities, and may calculate a separation measure of the regression machine learning model based on the Gaussian mixtures and the parameters of the estimates of the conditional densities. The bias detection system may calculate a sufficiency measure of the regression machine learning model based on the Gaussian mixtures and the parameters of the estimates of the conditional densities, and may perform one or more actions based on one or more of the independence measure, the separation measure, or the sufficiency measure.

In this way, the bias detection system provides fairness measures for regression machine learning models based on estimating conditional densities using Gaussian mixtures. For example, the bias detection system may receive sensitive attribute data, model prediction data, and true target data associated with a regression machine learning model. The bias detection system may calculate an independence measure, a separation measure, and sufficiency measure of the regression machine learning model based on the sensitive attribute data, the model prediction data, and the true target data. Thus, the bias detection system may conserve computing resources, networking resources, and/or other resources that would have otherwise been consumed by failing to generate unbiased regression machine learning models, erroneously utilizing biased results generated by biased regression machine learning models, attempting to correct biased regression machine learning models, failing to identify biased regression machine learning models, and/or the like.

FIGS. 1A-1G are diagrams of an example 100 associated with providing fairness measures for regression machine learning models based on estimating conditional densities using Gaussian mixtures. As shown in FIGS. 1A-1G, example 100 includes a user device 105 associated with a bias detection system 110. Further details of the user device 105 and the bias detection system 110 are provided elsewhere herein.

Mutual information or conditional mutual information of two random variables quantifies how much information is obtained about one variable by observing the other variable. Therefore, mutual information can be used to evaluate independence or conditional independence between two random variables. Mutual information is symmetric by definition.

For $\hat{Y}$, A, as an example, mutual information (I) of $\hat{Y}$, A can be calculated as follows:

$$I[\hat{Y}; A] = \int_{\hat{Y}} \sum_{a \in A} p(\hat{y}, a) \ln \frac{p(\hat{y}, a)}{p(\hat{y})P(A)} d\hat{y}. \tag{4}$$

If $\hat{Y}$ and A are independent with each other, their mutual information (I) will be zero. Otherwise, the mutual information (I) will be a positive number. To make it more meaningful, the mutual information may be bounded by normalizing the score to be between zero and one. Mutual information is related to entropy in the following way:

$$I[\hat{Y}; A] = H[A] - H[A \mid \hat{Y}] = H[\hat{Y}] - H[\hat{Y} \mid A], \tag{5}$$

where H[A] and H[$\hat{Y}$] are entropies of A and $\hat{Y}$ respectively, and H[A|$\hat{Y}$] and H[$\hat{Y}$|A] are conditional entropies correspondingly. Either H[A] or H[$\hat{Y}$] can be used as the normalizer to generate normalized mutual information (Ĭ) serving as a fairness metric as follows:

$$\breve{I}[\hat{Y}; A] = \frac{I[\hat{Y}; A]}{H[A]}, \tag{6}$$

-continued or $$\breve{I}[\hat{Y}; A] = \frac{I[\hat{Y}; A]}{H[\hat{Y}]}. \tag{7}$$

Depending on which normalizer is used, the normalized mutual information may be different, but Ĭ[Y, A]∈ [0, 1].

Similarly, conditional mutual information can be defined and used to evaluate conditional independence. For p($\hat{Y}$, A|Y), as an example, the conditional mutual information to evaluate the conditional independence between $\hat{Y}$ and A, given Y, is:

$$I[\hat{Y}; A \mid Y] = \int_y \int_{\hat{y}} \sum_{a \in A} p(y, \hat{y}, a) \ln \frac{p(\hat{y}, a \mid y)}{p(\hat{y} \mid y)P(a \mid y)} d\hat{y}dy, \tag{8}$$

and the normalizer for the conditional mutual information is the corresponding conditional entropy of either H[A|Y] or H[$\hat{Y}$|Y]. Equations 4-7 may serve to evaluate fairness criteria for independence Equation 1. Entropy and conditional entropy may be calculated as follows:

$$H[A] = -\sum_{a \in A} p(a) \ln p(a), \tag{9}$$

$$H[A \mid Y] = -\int_y \sum_{a \in A} p(y, a) \ln p(a \mid y) dy, \tag{10}$$

$$H[A \mid \hat{Y}] = -\int_{\hat{y}} \sum_{a \in A} p(\hat{y}, a) \ln p(a \mid \hat{y}) d\hat{y}, \tag{11}$$

As shown in FIG. 1A, and by reference number 115, the bias detection system 110 may receive sensitive attribute data, model prediction data, and true target data associated with a regression machine learning model. For example, the user device 105 may process the sensitive attribute data, with the regression machine learning model, to generate the model prediction data. A user of the user device 105 may provide the true target data to the user device 105. The user device 105 may provide the sensitive attribute data, the model prediction data, and the true target data to the bias detection system 110, and the bias detection system 110 may receive the sensitive attribute data, the model prediction data, and the true target data. The sensitive attribute data (A) may include discrete random variables (e.g., gender, ethnic group, and/or the like) for sensitive groups for which fairness is evaluated. The model prediction data ($\hat{Y}$) may include continuous random variables representing a prediction of the regression machine learning model. The true target data (Y) may include continuous random variables representing the true target variable of the regression machine learning model.

In some implementations, the bias detection system 110 may consider a pair-wise fairness comparison for the sensitive attribute data. When it comes to multiple categories of sensitive attributes, such as race, the bias detection system may evaluate all combinations of possible pairs. For a pair of instances of the sensitive attribute data (A) (e.g., $a^0$, $a^1$), the bias detection system 110 may determine that model fairness principles require a first distribution associated with A=$a^0$ to be similar in some degree to a second distribution associated with A=$a^1$. This may indicate that the sensitive attribute data (A) does not impact the relevant distributions, and that the regression machine learning model is fair.

In some implementations, the bias detection system 110 may utilize a model to calculate normalized mutual information by Gaussian mixtures as fairness metrics. The model may receive a data set that includes a true target variable, model output, and sensitive attributes as inputs, and may output the three fairness measures representing regression fairness in the independence ($\tilde{I}_{Ind}$), separation ($\tilde{I}_{Sep}$), and sufficiency measures ($\tilde{I}_{Suf}$). The model may receive a data set D that includes a target variable Y, model predictions $\hat{Y}$, and sensitive attributes A. Both Y and $\hat{Y}$ may be continuous variables, and A may be a categorical variable with non-negative integers {0, 1, 2, . . . , C}, where C is a positive integer.

As further shown in FIG. 1A, and by reference number 120, the bias detection system 110 may determine quantities (K) of Gaussian components for Gaussian mixtures associated with the regression machine learning model. For example, the bias detection system 110 may receive the quantities (K) of Gaussian components for the Gaussian mixtures from the user device 105. In some implementations, the model of the bias detection system 110 may receive a positive integer number K specifying the quantities of Gaussian components for the Gaussian mixtures.

Figure 1B:
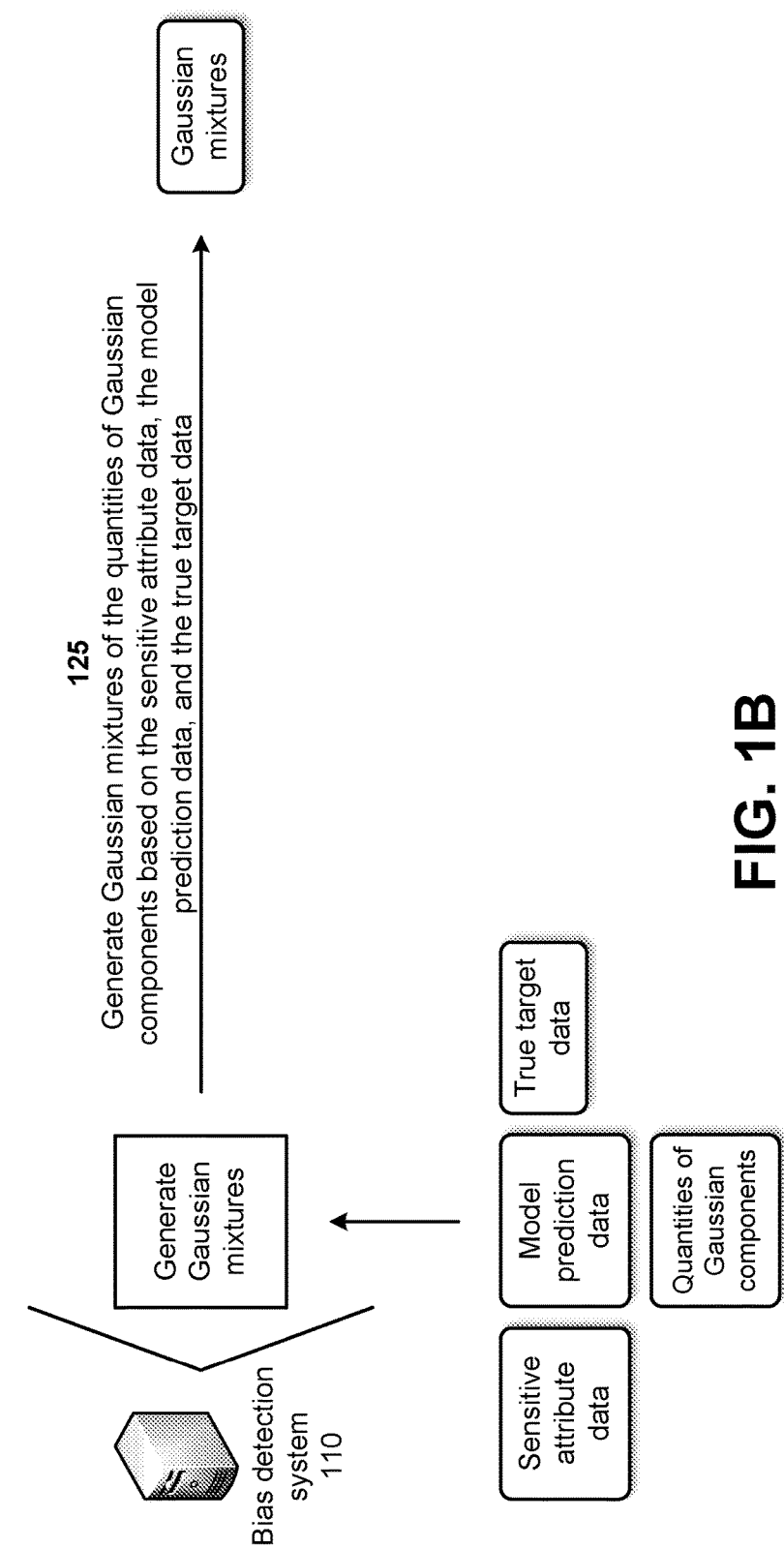

As shown in FIG. 1B, and by reference number 125, the bias detection system 110 may generate Gaussian mixtures of the quantities of Gaussian components based on the sensitive attribute data, the model prediction data, and the true target data. For example, when selecting normalizers, the bias detection system 110 may determine that a tighter upper bound provides a better normalizer. Generally, entropy for discrete variables may be well bounded, while entropy for continuous variables or conditional entropy for continuous variables may be infinite (e.g., or may not exist). Continuous entropy may be referred to as differential entropy and conditional continuous entropy may be referred to as conditional differential entropy. A probability density function may include a value that is greater than one. This results in a differential entropy that fails to share all properties of discrete entropy. For example, a uniform distribution U(0, ½) may include a negative differential entropy (e.g., $$\int_0^{\frac{1}{2}} -2\ln(2)\,dx = -\ln(2),$$ (45)

and U(0, 1) may include a zero differential entropy. In some implementations, the bias detection system 110 may compute both and then select a smaller one. The bias detection system 110 may select an entropy of discrete variables as the normalizer for normalized mutual information. Discrete entropy may be easier to compute compared to continuous entropy. In some implementations, the bias detection system 110 may utilize Gaussian mixtures to estimate any arbitrary continuous distribution with an arbitrary accuracy by using quantities of components in the Gaussian mixtures.

Figure 1C:
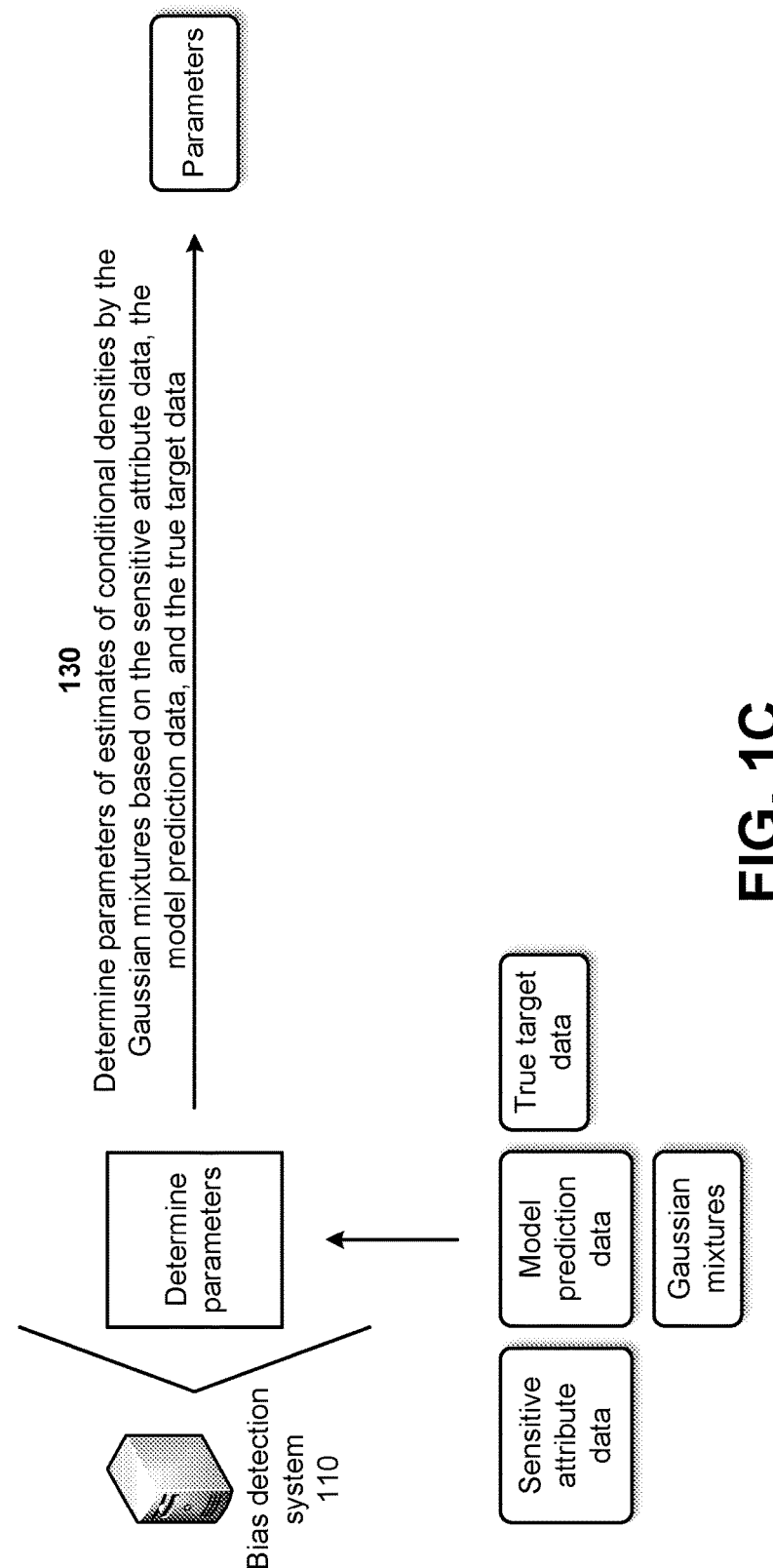

As shown in FIG. 1C, and by reference number 130, the bias detection system 110 may determine parameters of estimates of conditional densities by the Gaussian mixtures based on the sensitive attribute data, the model prediction data, and the true target data. For example, the bias detection system 110 may estimate the conditional density of one continuous variable given another continuous variable by estimating the joint density over the two variables. After estimating the joint density in a format of a multi-dimensional Gaussian mixture, the bias detection system 110 may analytically calculate a conditional density of one dimension, given another dimension, in a format of a one-dimensional Gaussian mixture based on original Gaussian components of the joint density. Specifically, for the following Gaussian mixture model with K components over the space of $x_1$ and $x_2$:

$$p(x_1, x_2) = \sum_{k=1}^{K} w_k N\left(\binom{x_1}{x_2}, \binom{\mu_1^k}{\mu_2^k}, \begin{vmatrix} \sum_{11}^{k} & \sum_{12}^{k} \\ \sum_{21}^{k} & \sum_{22}^{k} \end{vmatrix}\right),$$ (12)

where $x_1 \in \mathcal{R}^{D_1}$, $x_2 \in \mathcal{R}^{D_2}$, and k indexes the Gaussian components in the Gaussian mixture, $w_k$ represents a weight of the $k^{th}$ Gaussian component, and $\Sigma^k$'s are covariance matrices of $x_1$ and $x_2$ for the $k^{th}$ component.

The bias detection system 110 may calculate a conditional density of $x_1$, given $x_2$ based on Equation 12, with the same quantity of components of the Gaussian mixture representing the joint density as follows:

$$p(x_1 \mid x_2) = \sum_{k=1}^{K} m_k N\left(x_1, \mu_{1|2}^k, \sum_{1|2}^{k}\right),$$ (13)

where $m_k$ is a new mixing coefficient that represents the weight of the $k^{th}$ component of the conditional density, and $$\mu_{1|2}^k$$

and $$\sum_{1|2}^{k}$$

are the new mean vector and the covariance matrix of the $k^{th}$ Gaussian component in the new conditional mixture and may be calculated as follows:

$$\mu_{1|2}^k = \mu_1^k + \sum_{12}^{k} \left(\sum_{22}^{k}\right)^{-1}\left(x_2 - \mu_2^k\right),$$ (14)

$$\sum_{1|2}^{k} = \sum_{11}^{k} - \sum_{12}^{k} \left(\sum_{22}^{k}\right)^{-1}\sum_{21}^{k},$$ (15)

$$m_k = \frac{w_k \phi\left(x_2 \mid \mu_2^k, \sum_{22}^{k}\right)}{\sum_{k=1}^{K}\left(w_k \phi\left(x_2 \mid \mu_2^k, \sum_{22}^{k}\right)\right)},$$ (16)

where $$\phi\left(x_2 \mid \mu_2^k, \sum_{22}^{k}\right)$$

is the likelihood of an observed value of $x_2$ from the $k^{th}$ Gaussian component of the variable $x_2$.

The model may include a first function (e.g., gmm_em(d, K)) that returns a Gaussian mixture of K components from data d and learns a one-dimensional Gaussian mixture or a multi-dimensional Gaussian mixture based on the dimension of d. The model may include a second function (e.g., gmm_conditional($\phi(x_1, x_2)$, z)) that returns parameters of the Gaussian mixture estimate of the conditional density of $x_1$ given $x_2$ if $z=1$ or $x_2$ given $x_1$ if $z=2$ from the joint Gaussian mixture $\varphi(x_1, x_2)$, based on Equations 13-16. The model may perform one-dimensional Gaussian mixture learning based on:

$$\varphi(y) = \sum_{k=1}^{K} w_k N(\mu_k, V_k) \sim \text{gmm\_em}(D['Y'], K)$$

and $$\varphi(\hat{y}) = \sum_{k=1}^{K} \hat{w}_k N(\hat{\mu}_k, \hat{V}_k) \sim \text{gmm\_em}(D['\hat{Y}'], K).$$

The model may learn a Gaussian mixture given each unique value of A by calculating, for $a \in \{0, 1, 2, \dots, C\}$, $$\varphi(y \mid a) = \sum_{k=1}^{K} l_{ak} N(u_{ak}, S_{ak}) \sim \text{gmm\_em}(D[A = a, 'Y'], K)$$

and $$\varphi(\hat{y} \mid a) = \sum_{k=1}^{K} j_{ak} N(\hat{u}_{ak}, \hat{S}_{ak}) \sim \text{gmm\_em}(D[A = a, '\hat{Y}'], K).$$

The model may perform joint two-dimensional Gaussian mixture learning and conditional Gaussian mixture derivation based on $$\varphi(y, \hat{y}) = \sum_{k=1}^{K} r_k N\left(U_k, \sum_k\right) \sim \text{gmm\_em}(D['Y', '\hat{Y}'], K),$$

$$\varphi(y \mid \hat{y}) = \sum_{k=1}^{K} g_k N(h_k, Q_k) \sim \text{gmm\_conditional}(\varphi(y, \hat{y}), 1),$$

$$\text{and } \varphi(\hat{y} \mid y) = \sum_{k=1}^{K} \hat{g}_k N(\hat{h}_k, \hat{Q}_k) \sim \text{gmm\_conditional}(\varphi(y, \hat{y}), 2),$$

and by calculating the following for $\{0, 1, 2, \dots, C\}$:

$$\varphi(y, \hat{y} \mid a) = \sum_{k=1}^{K} r_{ak} N\left(U_{ak}, \sum_{ak}\right) \sim \text{gmm\_em}(D[A = 1, ['Y', '\hat{Y}']], K),$$

$$\varphi(y \mid \hat{y}, a) = \sum_{k=1}^{K} g_{ak} N(h_{ak}, Q_{ak}) \sim \text{gmm\_conditional}(\varphi(y, \hat{y} \mid a), 1),$$

and $$\varphi(\hat{y} \mid y, a) = \sum_{k=1}^{K} \hat{g}_{ak} N(\hat{h}_{ak}, \hat{Q}_{ak}) \sim \text{gmm\_conditional}(\varphi(y, \hat{y} \mid a), 2).$$

The model may output the three fairness measures representing regression fairness in the independence ($\tilde{I}_{Ind}$), separation ($\tilde{I}_{Sep}$), and sufficiency measures ($\tilde{I}_{ISuf}$) based on the calculations, as described below.

Figure 1D:
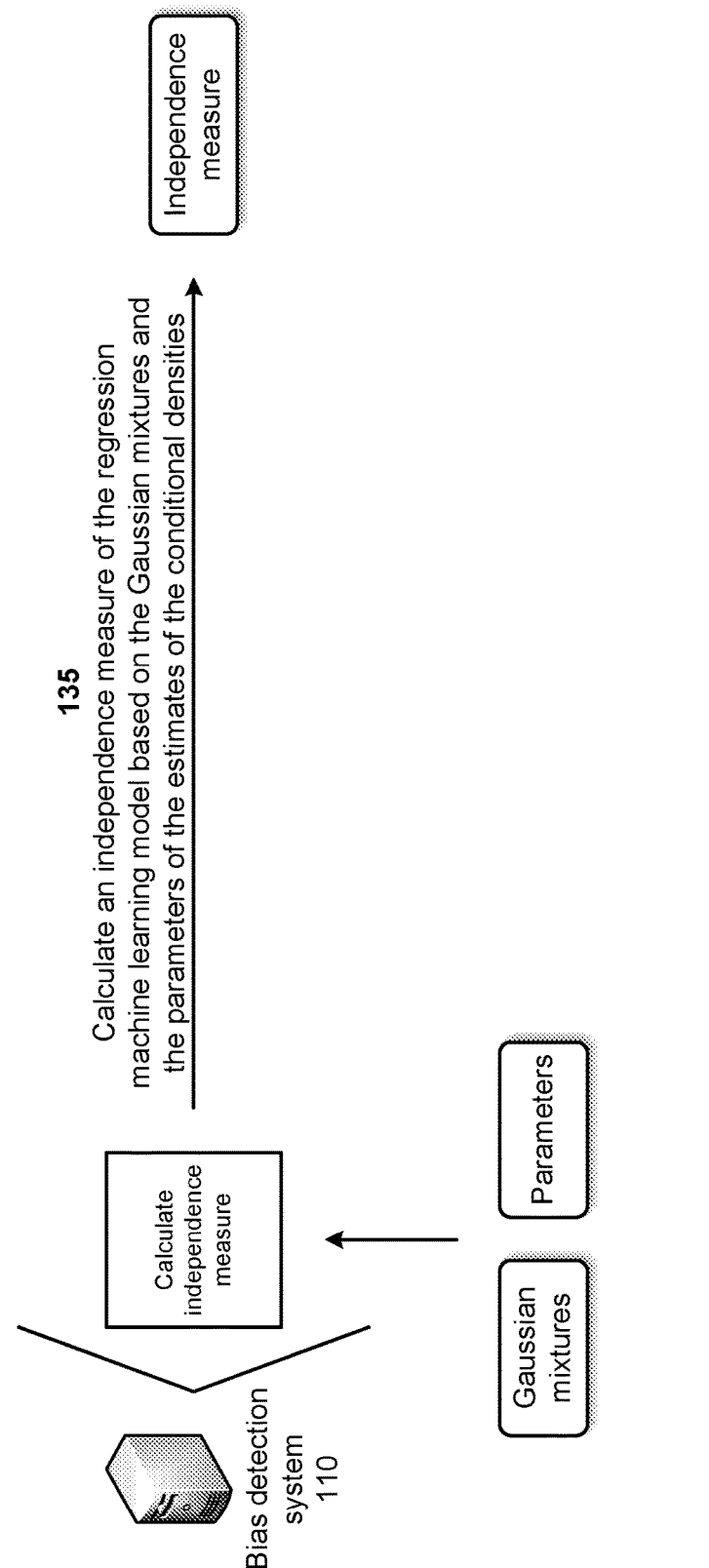

As shown in FIG. 1D, and by reference number 135, the bias detection system 110 may calculate an independence measure of the regression machine learning model based on the Gaussian mixtures and the parameters of the estimates of the conditional densities. For example, the bias detection system 110 may utilize measures, densities, and conditional densities when calculating the normalized mutual information. The bias detection system 110 may utilize densities $p(\hat{y})$ and $p(\hat{y}, a)$ for the independence measure, densities $p(\hat{y}, a \mid y)$ and $p(\hat{y} \mid y)$ for the separation measure, and densities $p(y, a \mid \hat{y})$ and $p(y \mid \hat{y})$ for the sufficiency measure. In addition, the bias detection system 110 may utilize the discrete probabilities $P(a \mid y)$ and $P(a \mid \hat{y})$ to calculate conditional entropies for normalizers. To calculate mutual information for the independence measure, the bias detection system 110 may estimate $p(\hat{y})$ and $p(\hat{y} \mid a)$ for each individual value of A. For Gaussian mixtures ($\varphi$), the bias detection system 110 may train $\varphi(\hat{y} \mid a)$ for each unique value of A and $\varphi(\hat{y})$ for all observations, with multiple one-dimensional Gaussian mixtures estimations, as follows:

$$I[\hat{Y}; A] = \int_{\hat{y}} \sum_{a \in A} p(\hat{y}, A) \ln \frac{p(\hat{y} \mid a)}{p(\hat{y})} d\hat{y} \approx \frac{1}{n} \sum_{i=1}^{n} \ln \frac{\varphi(\hat{y}_i \mid a^i)}{\varphi(\hat{y}_i)}, \quad (17)$$

$$\tilde{I}_{Ind} = \tilde{I}[\hat{Y}; A] = \frac{I[\hat{Y}; A]}{H[A]} \approx \frac{\frac{1}{n} \sum_{i=1}^{n} \ln \frac{\varphi(\hat{y}_i \mid a^i)}{\varphi(\hat{y}_i)}}{-\sum_{a \in A} \left(\frac{n_a}{n} \ln \frac{n_a}{n}\right)}.$$

Figure 1E:
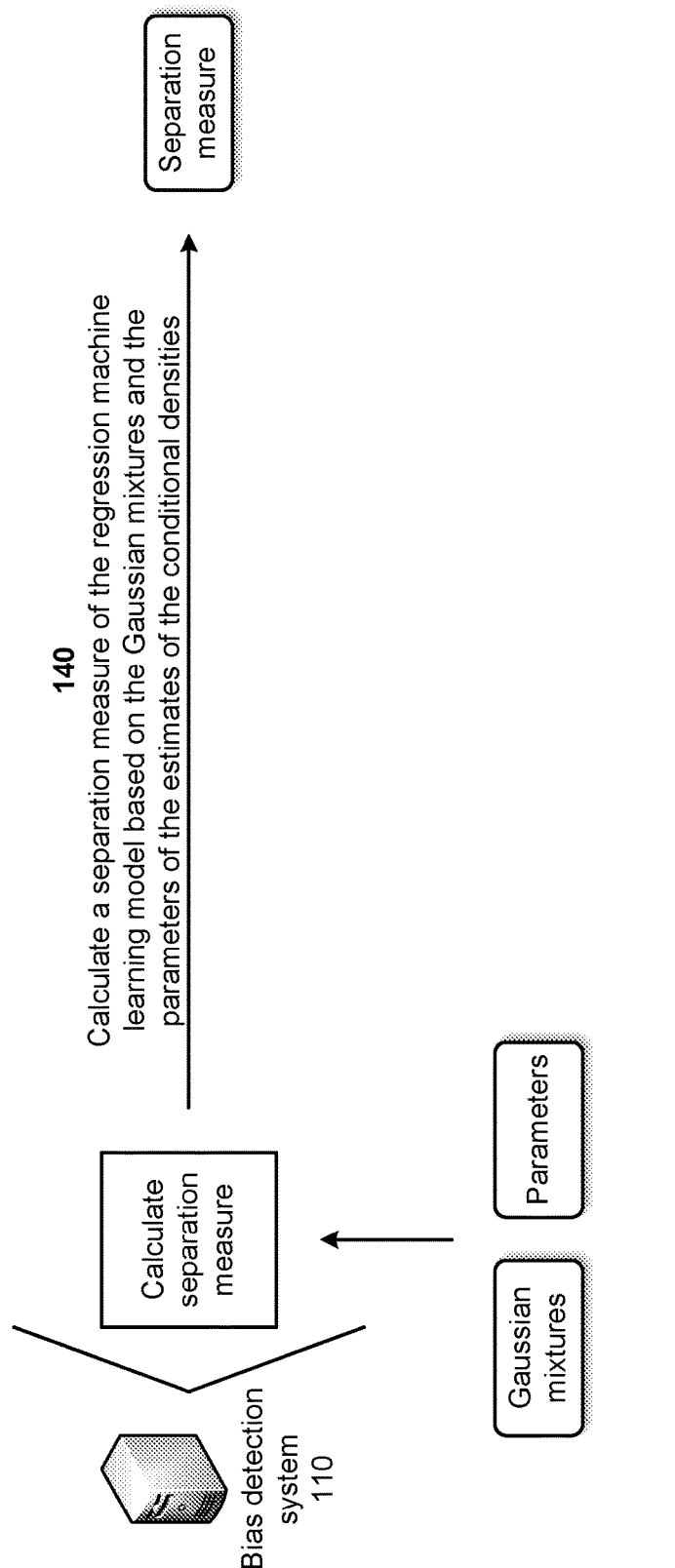

As shown in FIG. 1E, and by reference number 140, the bias detection system 110 may calculate a separation measure of the regression machine learning model based on the Gaussian mixtures and the parameters of the estimates of the conditional densities. For example, to calculate mutual information for the separation measure, the bias detection system 110 may utilize:

$$I[\hat{Y}; A \mid Y] = \int_y \int_{\hat{y}} \sum_{a \in A} p(y, \hat{y}, a) \ln \frac{p(\hat{y}, a \mid y)}{p(\hat{y} \mid y) P(a \mid y)} d\hat{y} dy =$$

$$\int_y \int_{\hat{y}} \sum_{a \in A} p(y, \hat{y}, a) \ln \frac{p(\hat{y} \mid y, a)}{p(\hat{y} \mid y)} d\hat{y} dy,$$

where the bias detection system 110 may estimate $p(\hat{y} \mid y, a)$ and $p(\hat{y} \mid y)$ when two continuous variables are engaged. The bias detection system 110 may utilize conditional Gaussian mixture estimate $\varphi(\hat{y} \mid y)$ to approximate $p(\hat{y} \mid y)$ by learning a two-dimensional Gaussian mixture $\varphi(\hat{y}, y)$ from data with a quantity of Gaussian components (e.g., three to five components) and deriving the conditional Gaussian mixture $\varphi(\hat{y} \mid y)$ using Equations 13-16 from $\varphi(\hat{y}, y)$. Similarly, the bias detection system 110 may train $\varphi(\hat{y} \mid y, a)$ to approximate $p(\hat{y} \mid y, a)$ with corresponding data for each instance of A. The bias detection system 110 may select $H[A \mid Y]$ as a normalizer, where:

$$P(a \mid y) = \frac{p(y \mid a) P(a)}{p(y)}.$$

The bias detection system 110 may utilize Equation 10 to generate:

$$H[A \mid Y] = \int_y \sum_{a \in A} p(y, a) \ln P(a \mid y) dy \approx -\frac{1}{n} \sum_{i=1}^{n} \ln \frac{\varphi(y_i \mid a^i) P(a^i)}{\varphi(y_i)},$$

where $\varphi(y \mid a)$ and $\varphi(y)$ are one-dimensional Gaussian mixtures that can be easily learned from data, similar to determining $\varphi(\hat{y} \mid a)$ and $\varphi(\hat{y})$ for independence fairness described above. Thus, the bias detection system 110 may calculate a normalized mutual information for the separation measure as follows:

$$I_{Sep} = \tilde{I}[\hat{Y}; A \mid Y] = \frac{I[\hat{Y}; A \mid Y]}{H[A \mid Y]} \approx \frac{\frac{1}{n}\sum_{i=1}^{n}\ln\frac{\varphi(\hat{y}_i \mid y_i, a_i)}{\varphi(\hat{y}_i \mid y_i)}}{-\frac{1}{n}\sum_{i=1}^{n}\ln\frac{\varphi(y_i \mid a^i)P(a^i)}{\varphi(y_i)}}. \quad (18)$$

Figure 1F:
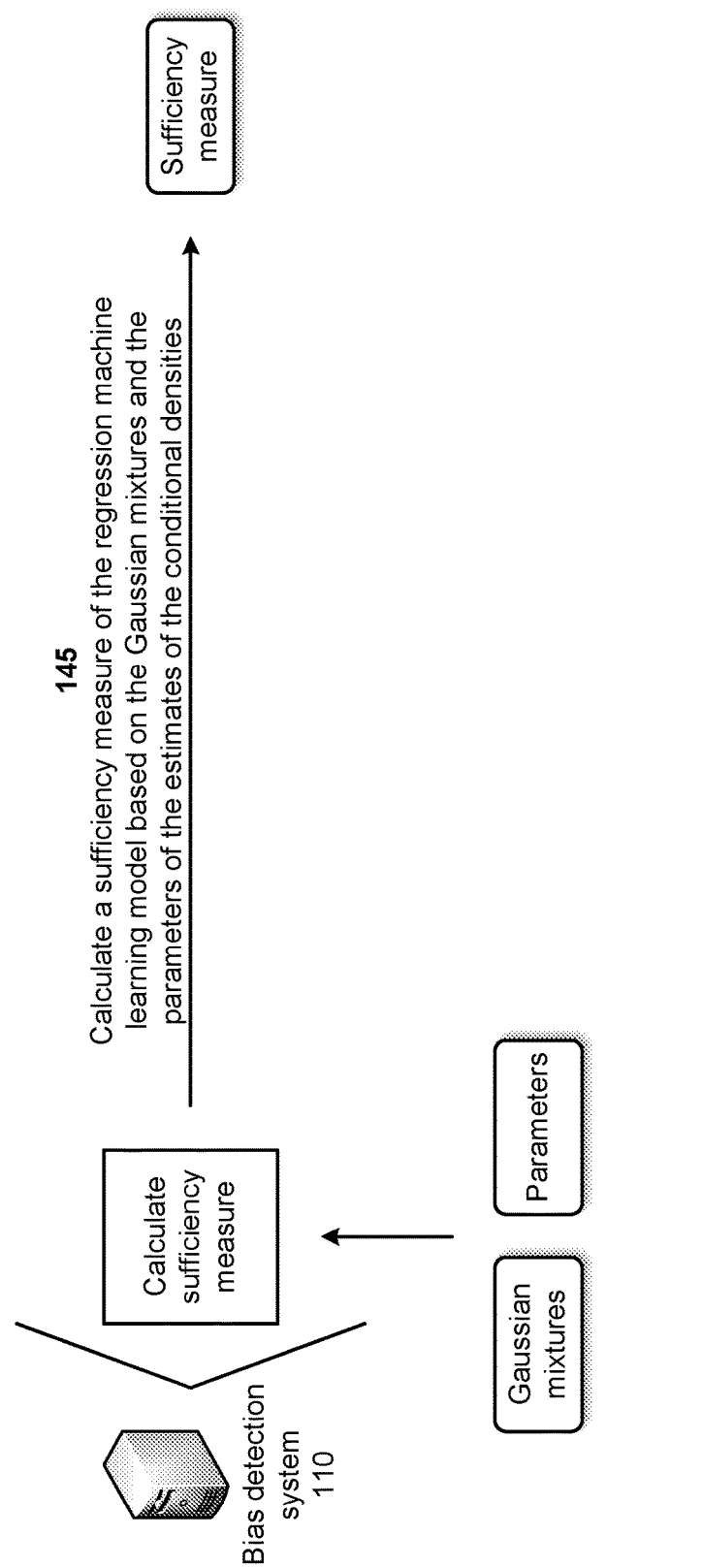

As shown in FIG. 1F, and by reference number 145, the bias detection system 110 may calculate a sufficiency measure of the regression machine learning model based on the Gaussian mixtures and the parameters of the estimates of the conditional densities. For example, the bias detection system 110 may calculate the sufficiency measure by evaluating the conditional independence between Y and A, given Ý. The sufficiency measure may be very similar to the estimation process for separation process, except a conditional order of variables is the opposite (e.g., p(y|ŷ) instead of p(ŷ|y)). Accordingly, conditional Gaussian mixture estimates of φ(y|ŷ) and φ(y|ŷ, a) may be derived from the associated joint densities. A normalizer for the sufficiency measure may be H[A|Ý] and the bias detection system 110 may approximate the normalizer as follows:

$$H[A \mid \hat{Y}] = \int_{\hat{y}}\sum_{a \in A} p(a, \hat{y})\ln P(a \mid \hat{y})\, d\hat{y} \approx -\frac{1}{n}\sum_{i=1}^{n}\ln\frac{\varphi(\hat{y}_i \mid a^i)P(a^i)}{\varphi(\hat{y}_i)},$$

where φ(ŷ) and φ(ŷ|a) are learned in independence fairness evaluation, described above. The bias detection system 110 may compute normalized mutual information for sufficiency fairness as follows:

$$I_{Suf} = \tilde{I}[\hat{Y}; A \mid \hat{Y}] = \frac{I[Y; A \mid \hat{Y}]}{H[A \mid \hat{Y}]} = \frac{\frac{1}{n}\sum_{i=1}^{n}\ln\frac{\varphi(y_i \mid \hat{y}_i, a^i)}{\varphi(y_i \mid \hat{y}_i)}}{-\frac{1}{n}\sum_{i=1}^{n}\ln\frac{\varphi(\hat{y}_i \mid a^i)P(a^i)}{\varphi(\hat{y}_i)}}. \quad (19)$$

As shown in FIG. 1G, and by reference number 170, the bias detection system 110 may perform one or more actions based on the independence fairness measure, the separation measure, and/or the sufficiency measure. In some implementations, performing the one or more actions includes the bias detection system 110 determining whether the regression machine learning model is biased based on comparing the independence fairness measure and an independence threshold. For example, the bias detection system 110 may compare the independence fairness measure and an independence threshold, and may determine whether the regression machine learning model is biased based on comparing the independence fairness measure and the independence threshold. The bias detection system 110 may provide an indication of whether the regression machine learning model is biased based on the determination. In this way, the bias detection system 110 may conserve computing resources, networking resources, and/or other resources that would have otherwise been consumed by failing to generate unbiased regression machine learning models.

In some implementations, performing the one or more actions includes the bias detection system 110 determining whether the regression machine learning model is biased based on comparing the separation measure and a separation threshold. For example, the bias detection system 110 may determine whether the regression machine learning model is biased based on comparing the separation measure and a separation threshold. The bias detection system 110 may provide an indication of whether the regression machine learning model is biased based on the determination. In this way, the bias detection system 110 may conserve computing resources, networking resources, and/or other resources that would have otherwise been consumed by erroneously utilizing biased results generated by biased regression machine learning models.

In some implementations, performing the one or more actions includes the bias detection system 110 determining whether the regression machine learning model is biased based on comparing the sufficiency measure and a sufficiency threshold. For example, the bias detection system 110 may determine whether the regression machine learning model is biased based on comparing the sufficiency measure and a sufficiency threshold. The bias detection system 110 may provide an indication of whether the regression machine learning model is biased based on the determination. In this way, the bias detection system 110 may conserve computing resources, networking resources, and/or other resources that would have otherwise been consumed by attempting to correct biased regression machine learning models.

In some implementations, performing the one or more actions includes the bias detection system 110 determining whether the regression machine learning model is biased based on the independence fairness measure, the separation measure, and/or the sufficiency measure. For example, the bias detection system 110 may determine whether the regression machine learning model is biased based on one or more of the independence fairness measure, the separation measure, and/or the sufficiency measure. The bias detection system 110 may provide an indication of whether the regression machine learning model is biased based on the determination. In this way, the bias detection system 110 may conserve computing resources, networking resources, and/or other resources that would have otherwise been consumed by failing to generate unbiased regression machine learning models, erroneously utilizing biased results generated by biased regression machine learning models, attempting to correct biased regression machine learning models, and/or the like.

In some implementations, performing the one or more actions includes the bias detection system 110 retraining the regression machine learning model based on the independence fairness measure, the separation measure, and/or the sufficiency measure. For example, the bias detection system 110 may utilize the independence fairness measure, the separation measure, and/or the sufficiency measure as additional training data for retraining the regression machine learning model, thereby increasing the quantity of training data available for training the regression machine learning model. Accordingly, the bias detection system 110 may conserve computing resources associated with identifying, obtaining, and/or generating historical data for training the regression machine learning model relative to other systems for identifying, obtaining, and/or generating historical data for training machine learning models.

In this way, the bias detection system provides fairness measures for regression machine learning models based on estimating conditional densities using Gaussian mixtures. For example, the bias detection system may receive sensitive attribute data, model prediction data, and true target data associated with a regression machine learning model. The bias detection system may calculate an independence measure, a separation measure, and sufficiency measure of the regression machine learning model based on the sensitive attribute data, the model prediction data, and the true target data. Thus, the bias detection system may conserve computing resources, networking resources, and/or other resources that would have otherwise been consumed by failing to generate unbiased regression machine learning models, erroneously utilizing biased results generated by biased regression machine learning models, attempting to correct biased regression machine learning models, failing to identify biased regression machine learning models, and/ or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
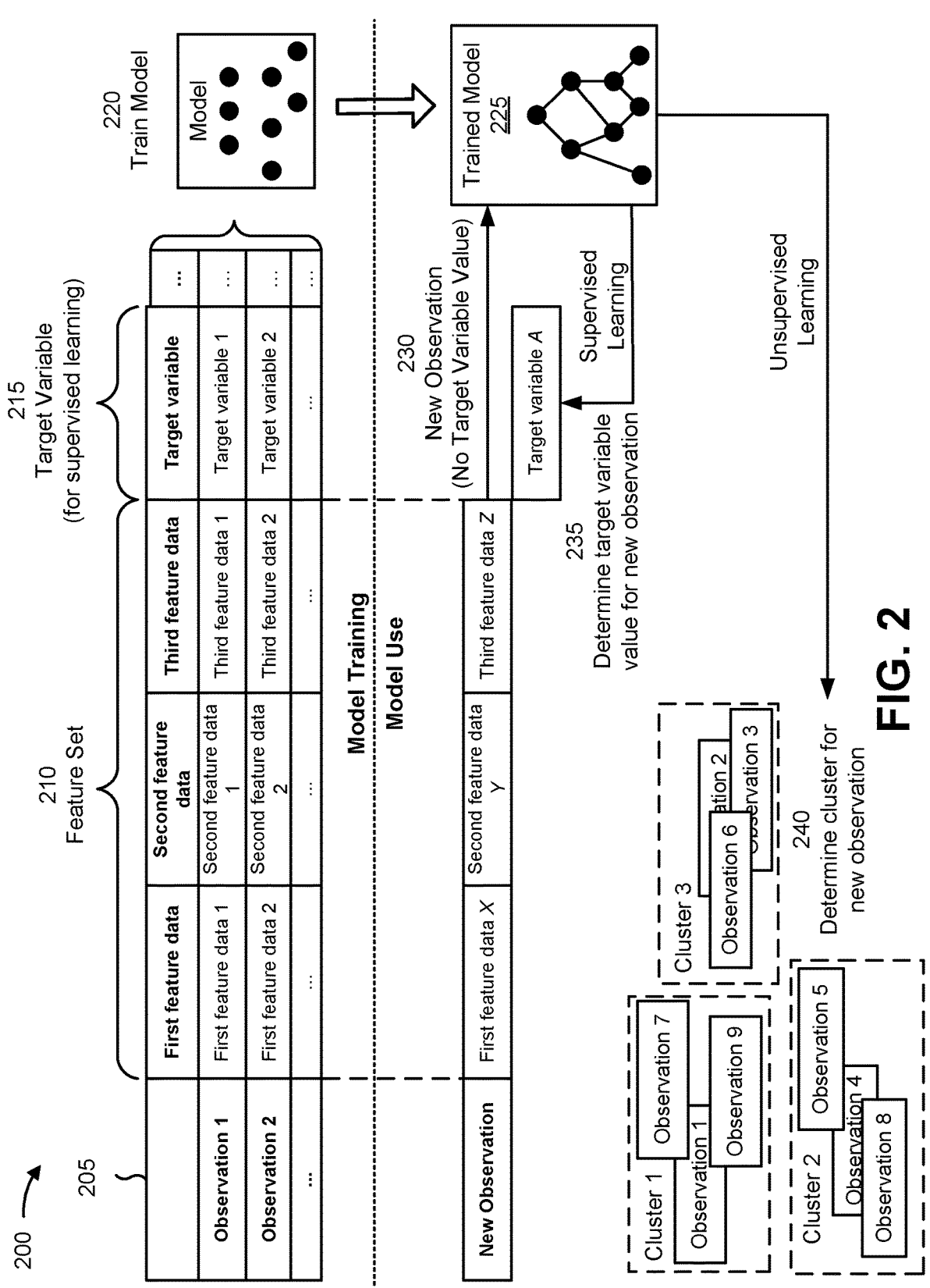
FIG. 2 is a diagram illustrating an example of training and using a machine learning model.

FIG. 2 is a diagram illustrating an example 200 of training and using a machine learning model in connection with systems and methods for providing fairness measures for regression machine learning models based on estimating conditional densities using Gaussian mixtures. The machine learning model training and usage described herein may be performed using a machine learning system. The machine learning system may include or may be included in a computing device, a server, a cloud computing environment, or the like, such as the bias detection system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the bias detection system 110, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the bias detection system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first feature data, a second feature of second feature data, a third feature of third feature data, and so on. As shown, for a first observation, the first feature may have a value of first feature data 1, the second feature may have a value of second feature data 1, the third feature may have a value of third feature data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable has a value of target variable 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first feature data X, a second feature of second feature data Y, a third feature of third feature data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of target variable A for the target variable for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first feature data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second feature data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to provide fairness measures for regression machine learning models based on estimating conditional densities using Gaussian mixtures. The machine learning system may enable recognition and/or identification of tens, hundreds, thousands, or millions of features and/or feature values for tens, hundreds, thousands, or millions of observations, thereby increasing accuracy and consistency and reducing delay associated with providing fairness measures for regression machine learning models based on estimating conditional densities using Gaussian mixtures relative to requiring computing resources to be allocated for tens, hundreds, or thousands of operators to manually provide fairness measures for regression machine learning models based on estimating conditional densities using Gaussian mixtures.

As indicated above, FIG. 2 is provided as an example. Other examples may differ from what is described in connection with FIG. 2.

Figure 3:
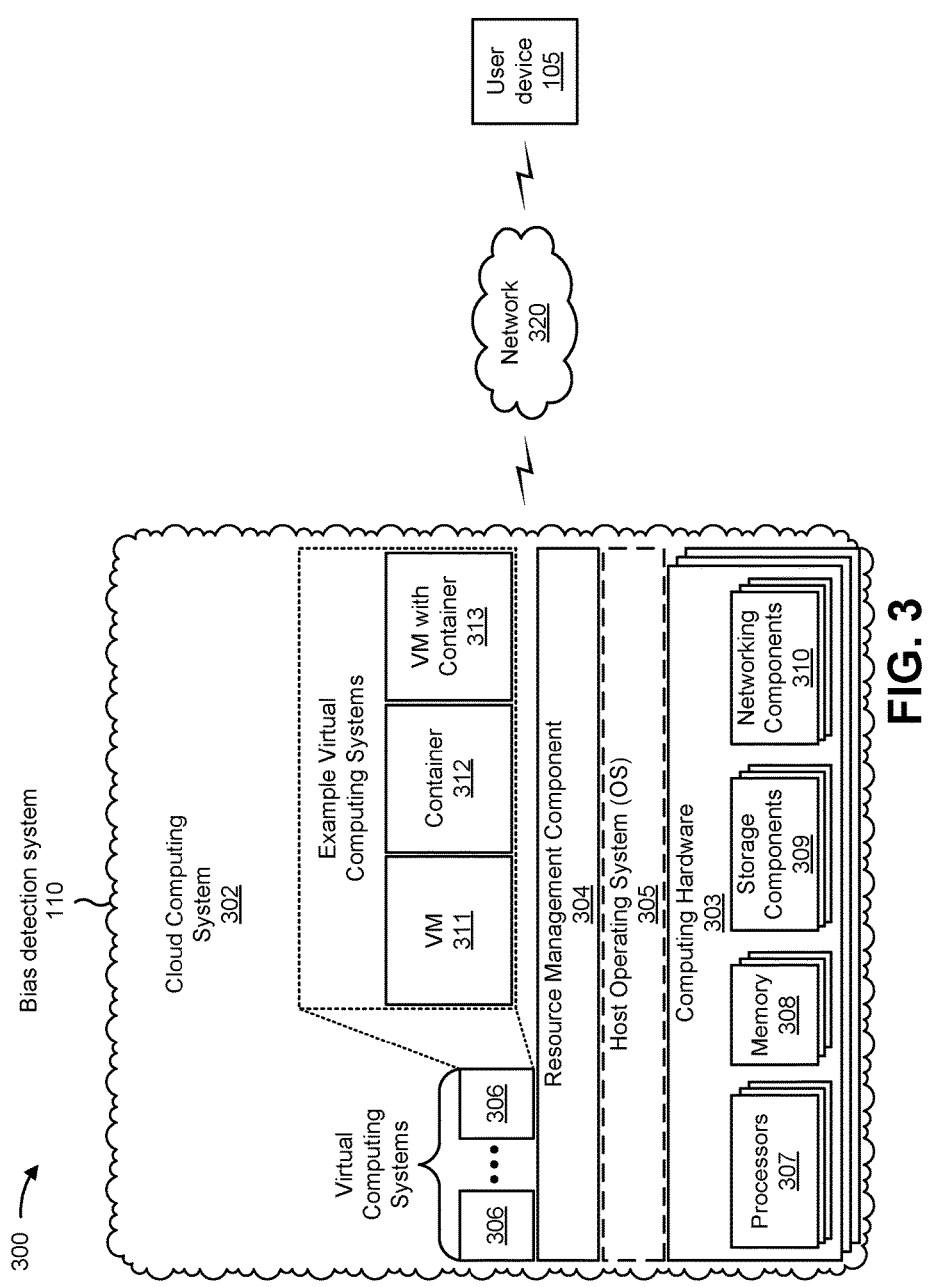
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the bias detection system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the bias detection system 110 may include one or more elements 303-313 of the cloud computing system 302, may execute within the cloud computing system 302, and/or may be hosted within the cloud computing system 302, in some implementations, the bias detection system 110 may not be cloud-based (e.g., may be implemented outside of a cloud computing system) or may be partially cloud-based. For example, the bias detection system 110 may include one or more devices that are not part of the cloud computing system 302, such as the device 400 of FIG. 4, which may include a standalone server or another type of computing device. The bias detection system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
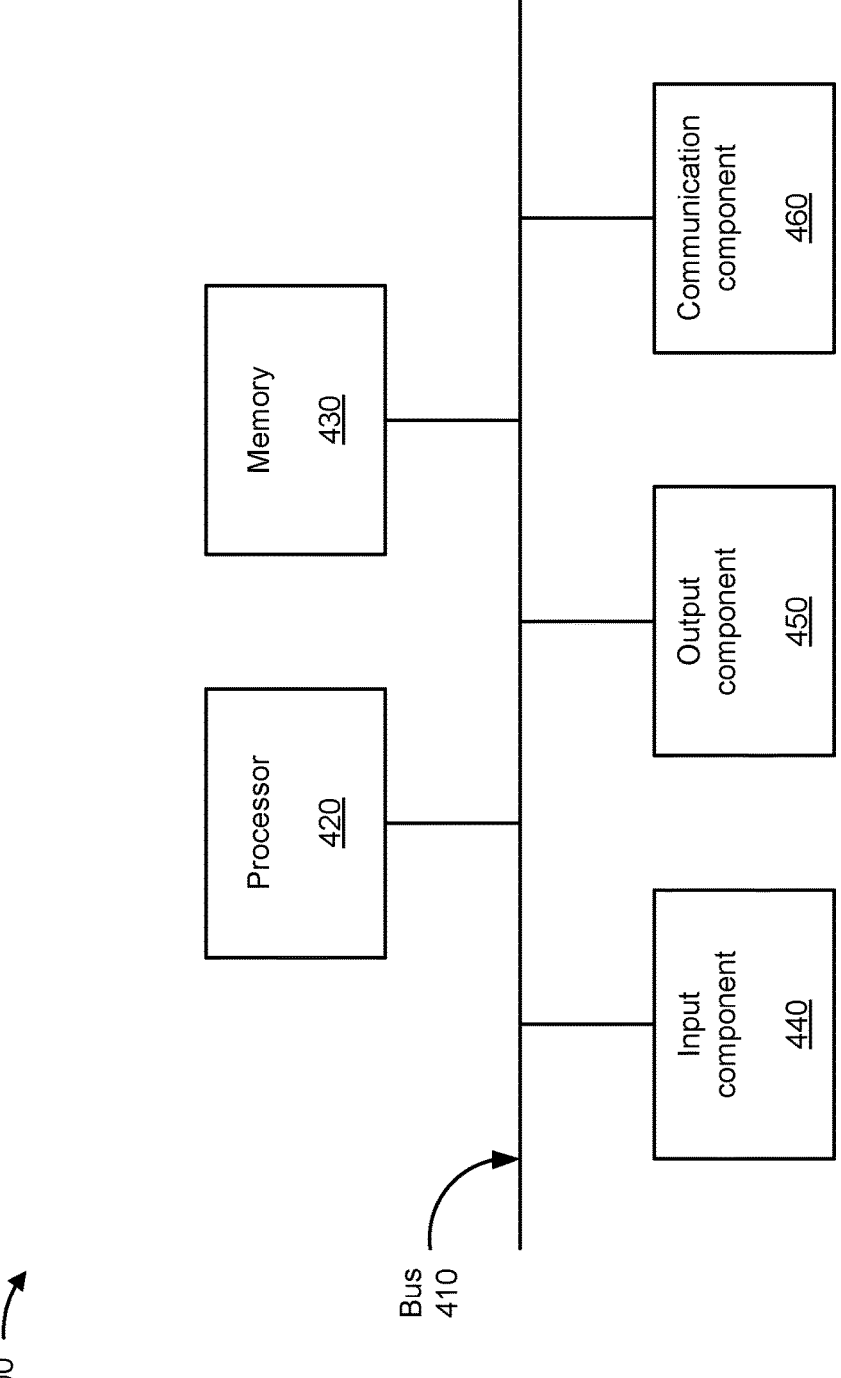
FIG. 4 is a diagram of example components of one or more devices of FIG. 3.

FIG. 4 is a diagram of example components of a device 400, which may correspond to the user device 105 and/or the bias detection system 110. In some implementations, the user device 105 and/or the bias detection system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing fairness measures for regression machine learning models based on estimating conditional densities using Gaussian mixtures. In some implementations, one or more process blocks of FIG. 5 may be performed by a device (e.g., the bias detection system 110). In some implementations, one or more process blocks of FIG. 5 may be performed by another device or a group of devices separate from or including the device, such as a user device (e.g., the user device 105), and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving sensitive attribute data, model prediction data, and true target data associated with a regression machine learning model (block 510). For example, the device may receive sensitive attribute data, model prediction data, and true target data associated with a regression machine learning model, as described above.

As further shown in FIG. 5, process 500 may include determining quantities of Gaussian components for Gaussian mixtures associated with the regression machine learning model (block 520). For example, the device may determine quantities of Gaussian components for Gaussian mixtures associated with the regression machine learning model, as described above.

As further shown in FIG. 5, process 500 may include generating Gaussian mixtures of the quantities of Gaussian components based on the sensitive attribute data, the model prediction data, and the true target data (block 530). For example, the device may generate Gaussian mixtures of the quantities of Gaussian components based on the sensitive attribute data, the model prediction data, and the true target data, as described above. In some implementations, generating the Gaussian mixtures of the quantities of Gaussian components based on the sensitive attribute data, the model prediction data, and the true target data includes utilizing a function to generate the Gaussian mixtures of the quantities of Gaussian components based on the sensitive attribute data, the model prediction data, and the true target data.

As further shown in FIG. 5, process 500 may include determining parameters of estimates of conditional densities by the Gaussian mixtures based on the sensitive attribute data, the model prediction data, and the true target data (block 540). For example, the device may determine parameters of estimates of conditional densities by the Gaussian mixtures based on the sensitive attribute data, the model prediction data, and the true target data, as described above. In some implementations, determining the parameters of estimates of conditional densities by the Gaussian mixtures based on the sensitive attribute data, the model prediction data, and the true target data includes utilizing a function to determine the parameters of estimates of conditional densities by the Gaussian mixtures based on the sensitive attribute data, the model prediction data, and the true target data.

As further shown in FIG. 5, process 500 may include calculating an independence measure of the regression machine learning model based on the Gaussian mixtures and the parameters of the estimates of the conditional densities (block 550). For example, the device may calculate an independence measure of the regression machine learning model based on the Gaussian mixtures and the parameters of the estimates of the conditional densities, as described above.

As further shown in FIG. 5, process 500 may include calculating a separation measure of the regression machine learning model based on the Gaussian mixtures and the parameters of the estimates of the conditional densities (block 560). For example, the device may calculate a separation measure of the regression machine learning model based on the Gaussian mixtures and the parameters of the estimates of the conditional densities, as described above.

As further shown in FIG. 5, process 500 may include calculating a sufficiency measure of the regression machine learning model based on the Gaussian mixtures and the parameters of the estimates of the conditional densities (block 570). For example, the device may calculate a sufficiency measure of the regression machine learning model based on the Gaussian mixtures and the parameters of the estimates of the conditional densities, as described above.

As further shown in FIG. 5, process 500 may include performing one or more actions based on one or more of the independence measure, the separation measure, or the sufficiency measure (block 580). For example, the device may perform one or more actions based on one or more of the independence measure, the separation measure, or the sufficiency measure, as described above. In some implementations, the independence measure, the separation measure, and the sufficiency measure represent a fairness associated with the regression machine learning model. In some implementations, performing the one or more actions includes determining whether the regression machine learning model is biased based on comparing the separation measure and a separation threshold, and providing an indication of whether the regression machine learning model is biased.

In some implementations, performing the one or more actions includes determining whether the regression machine learning model is biased based on comparing the sufficiency measure and a sufficiency threshold, and providing an indication of whether the regression machine learning model is biased. In some implementations, performing the one or more actions includes one or more of determining whether the regression machine learning model is biased based on one or more of the independence measure, the separation measure, or the sufficiency measure, or retraining the regression machine learning model based on one or more of the independence measure, the separation measure, or the sufficiency measure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, sensitive attribute data, model prediction data, and true target data associated with a regression machine learning model;

determining, by the device, quantities of Gaussian components for Gaussian mixtures associated with the regression machine learning model;

generating, by the device, Gaussian mixtures of the quantities of Gaussian components based on the sensitive attribute data, the model prediction data, and the true target data;

determining, by the device, parameters of estimates of conditional densities by the Gaussian mixtures based on the sensitive attribute data, the model prediction data, and the true target data;

calculating, by the device, an independence measure of the regression machine learning model based on the Gaussian mixtures and the parameters of the estimates of the conditional densities;

calculating, by the device, a separation measure of the regression machine learning model based on the Gaussian mixtures and the parameters of the estimates of the conditional densities;

calculating, by the device, a sufficiency measure of the regression machine learning model based on the Gaussian mixtures and the parameters of the estimates of the conditional densities; and performing, by the device, one or more actions based on one or more of the independence measure, the separation measure, or the sufficiency measure.

2. The method of claim 1, wherein generating the Gaussian mixtures of the quantities of Gaussian components based on the sensitive attribute data, the model prediction data, and the true target data comprises:
utilizing a function to generate the Gaussian mixtures of the quantities of Gaussian components based on the sensitive attribute data, the model prediction data, and the true target data.

3. The method of claim 1, wherein determining the parameters of the estimates of the conditional densities by the Gaussian mixtures based on the sensitive attribute data, the model prediction data, and the true target data comprises:
utilizing a function to determine the parameters of the estimates of the conditional densities by the Gaussian mixtures based on the sensitive attribute data, the model prediction data, and the true target data.

4. The method of claim 1, wherein the independence measure, the separation measure, and the sufficiency measure represent a fairness associated with the regression machine learning model.

5. The method of claim 1, wherein performing the one or more actions comprises:
determining whether the regression machine learning model is biased based on comparing the separation measure and a separation threshold; and
providing an indication of whether the regression machine learning model is biased.

6. The method of claim 1, wherein performing the one or more actions comprises:
determining whether the regression machine learning model is biased based on comparing the sufficiency measure and a sufficiency threshold; and
providing an indication of whether the regression machine learning model is biased.

7. The method of claim 1, wherein performing the one or more actions comprises one or more of:
determining whether the regression machine learning model is biased based on one or more of the independence measure, the separation measure, or the sufficiency measure; or retraining the regression machine learning model based on one or more of the independence measure, the separation measure, or the sufficiency measure.

8. A device, comprising:

one or more processors configured to:

receive sensitive attribute data, model prediction data, and true target data associated with a regression machine learning model;

determine quantities of Gaussian components for Gaussian mixtures associated with the regression machine learning model;

generate Gaussian mixtures of the quantities of Gaussian components based on the sensitive attribute data, the model prediction data, and the true target data;

determine parameters of estimates of conditional densities by the Gaussian mixtures based on the sensitive attribute data, the model prediction data, and the true target data;

calculate an independence measure of the regression machine learning model based on the Gaussian mixtures and the parameters of the estimates of the conditional densities;

calculate a separation measure of the regression machine learning model based on the Gaussian mixtures and the parameters of the estimates of the conditional densities;

calculate a sufficiency measure of the regression machine learning model based on the Gaussian mixtures and the parameters of the estimates of the conditional densities; and perform one or more actions based on one or more of the independence measure, the separation measure, or the sufficiency measure.

9. The device of claim 8, wherein the one or more processors, to generate the Gaussian mixtures of the quantities of Gaussian components based on the sensitive attribute data, the model prediction data, and the true target data, are configured to:

utilize a function to generate the Gaussian mixtures of the quantities of Gaussian components based on the sensitive attribute data, the model prediction data, and the true target data.

10. The device of claim 8, wherein the one or more processors, to determine the parameters of the estimates of the conditional densities by the Gaussian mixtures based on the sensitive attribute data, the model prediction data, and the true target data, are configured to:

utilize a function to determine the parameters of the estimates of the conditional densities by the Gaussian mixtures based on the sensitive attribute data, the model prediction data, and the true target data.

11. The device of claim 8, wherein the independence measure, the separation measure, and the sufficiency measure represent a fairness associated with the regression machine learning model.

12. The device of claim 8, wherein the one or more processors, to perform the one or more actions, are configured to:

determine whether the regression machine learning model is biased based on comparing the separation measure and a separation threshold; and provide an indication of whether the regression machine learning model is biased.

13. The device of claim 8, wherein the one or more processors, to perform the one or more actions, are configured to:

determine whether the regression machine learning model is biased based on comparing the sufficiency measure and a sufficiency threshold; and provide an indication of whether the regression machine learning model is biased.

14. The device of claim 8, wherein the one or more processors, to perform the one or more actions, are configured to one or more of:

determine whether the regression machine learning model is biased based on one or more of the independence measure, the separation measure, or the sufficiency measure; or retrain the regression machine learning model based on one or more of the independence measure, the separation measure, or the sufficiency measure.

15. A non-transitory computer-readable medium storing a set of instructions, the set of instructions comprising:

one or more instructions that, when executed by one or more processors of a device, cause the device to:

receive sensitive attribute data, model prediction data, and true target data associated with a regression machine learning model;

determine quantities of Gaussian components for Gaussian mixtures associated with the regression machine learning model;

generate Gaussian mixtures of the quantities of Gaussian components based on the sensitive attribute data, the model prediction data, and the true target data;

determine parameters of estimates of conditional densities by the Gaussian mixtures based on the sensitive attribute data, the model prediction data, and the true target data;

calculate an independence measure of the regression machine learning model based on the Gaussian mixtures and the parameters of the estimates of the conditional densities;

calculate a separation measure of the regression machine learning model based on the Gaussian mixtures and the parameters of the estimates of the conditional densities;

calculate a sufficiency measure of the regression machine learning model based on the Gaussian mixtures and the parameters of the estimates of the conditional densities; and perform one or more actions based on one or more of the independence measure, the separation measure, or the sufficiency measure.

16. The non-transitory computer-readable medium of claim 15, wherein the one or more instructions, that cause the device to generate the Gaussian mixtures of the quantities of Gaussian components based on the sensitive attribute data, the model prediction data, and the true target data, cause the device to:

utilize a function to generate the Gaussian mixtures of the quantities of Gaussian components based on the sensitive attribute data, the model prediction data, and the true target data.

17. The non-transitory computer-readable medium of claim 15, wherein the one or more instructions, that cause the device to determine the parameters of the estimates of the conditional densities by the Gaussian mixtures based on the sensitive attribute data, the model prediction data, and the true target data, cause the device to:

utilize a function to determine the parameters of the estimates of the conditional densities by the Gaussian mixtures based on the sensitive attribute data, the model prediction data, and the true target data.

18. The non-transitory computer-readable medium of claim 15, wherein the one or more instructions, that cause the device to perform the one or more actions, cause the device to:

determine whether the regression machine learning model is biased based on comparing the separation measure and a separation threshold; and provide an indication of whether the regression machine learning model is biased.

19. The non-transitory computer-readable medium of claim 15, wherein the one or more instructions, that cause the device to perform the one or more actions, cause the device to:

determine whether the regression machine learning model is biased based on comparing the sufficiency measure and a sufficiency threshold; and provide an indication of whether the regression machine learning model is biased.

20. The non-transitory computer-readable medium of claim 15, wherein the one or more instructions, that cause the device to perform the one or more actions, cause the device to one or more of:

determine whether the regression machine learning model is biased based on one or more of the independence measure, the separation measure, or the sufficiency measure; or retrain the regression machine learning model based on one or more of the independence measure, the separation measure, or the sufficiency measure.

* * * * *